United States Patent
Ohta

(10) Patent No.: US 9,043,427 B2
(45) Date of Patent: May 26, 2015

(54) RESPONSE DEVICE, INTEGRATED CIRCUIT OF SAME, RESPONSE METHOD, AND RESPONSE SYSTEM

(75) Inventor: Yuusaku Ohta, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 425 days.

(21) Appl. No.: 13/518,982

(22) PCT Filed: Jun. 20, 2011

(86) PCT No.: PCT/JP2011/003506
§ 371 (c)(1),
(2), (4) Date: Jun. 25, 2012

(87) PCT Pub. No.: WO2012/001908
PCT Pub. Date: Jan. 5, 2012

(65) Prior Publication Data
US 2012/0265839 A1   Oct. 18, 2012

(30) Foreign Application Priority Data
Jun. 28, 2010 (JP) .................................. 2010-145999

(51) Int. Cl.
*G06F 15/167* (2006.01)
*H04L 29/08* (2006.01)
*G06F 3/06* (2006.01)

(52) U.S. Cl.
CPC .......... *H04L 67/1097* (2013.01); *G06F 3/0613* (2013.01); *G06F 3/0625* (2013.01); *G06F 3/0659* (2013.01); *G06F 3/0689* (2013.01); *Y02B 60/1246* (2013.01); *H04L 69/32* (2013.01)

(58) Field of Classification Search
CPC ..................... H04L 67/1097; H04L 29/08549; H04L 49/9094

USPC ..................................... 709/201, 212; 710/22
See application file for complete search history.

(56) References Cited

U.S. PATENT DOCUMENTS 6,115,803 A    9/2000  Hayashi et al.
6,237,021 B1 *  5/2001  Drummond ................... 709/201
(Continued)

FOREIGN PATENT DOCUMENTS

JP    7-311750    11/1995
JP    8-212179    8/1996
(Continued)

OTHER PUBLICATIONS

Direct Memory Access—Wikipedia.*
(Continued)

*Primary Examiner* — Vivek Srivastava
*Assistant Examiner* — Karina J Garcia-Ching
(74) *Attorney, Agent, or Firm* — Wenderoth, Lind & Ponack, L.L.P.

(57) ABSTRACT

The present invention performs efficient data transfer between devices. In particular, the present invention can reduce processing loads and power consumption of a response device and increase overall throughput. When a request device issues a direct transfer request to directly transfer data to or from a data storage unit included in the response device, the response device performs control so that data is directly transferred between a communication unit and the data storage unit. The request device is allowed to transparently and directly access the data storage unit included in the response device via the communication unit between the request device and the response device.

30 Claims, 12 Drawing Sheets

(56) References Cited

U.S. PATENT DOCUMENTS

| | | | |
|---|---|---|---|
| 6,922,740 B2 * | 7/2005 | Kondratiev et al. | 710/22 |
| 2006/0200864 A1 | 9/2006 | Nakanishi et al. | |
| 2006/0242087 A1 * | 10/2006 | Naehr et al. | 705/68 |

FOREIGN PATENT DOCUMENTS

| | | |
|---|---|---|
| JP | 2004-295352 | 10/2004 |
| JP | 2008-529109 | 7/2008 |
| WO | 2006/076993 | 7/2006 |

OTHER PUBLICATIONS

International Search Report issued Sep. 13, 2011 in corresponding International Application No. PCT/JP2011/003506.

"IEEE Standard for Information technology—Telecommunications and information exchange between systems—Local and metropolitan area networks—Specific requirements, Part 11: Wireless LAN Medium Access Control (MAC) and Physical layer (PHY) Specifications, Amendment 5: Enhancements for Higher Throughput", IEEE Computer Society, IEEE Std 802.11n™ 2009, Oct. 29, 2009, pp. 1-502.

* cited by examiner

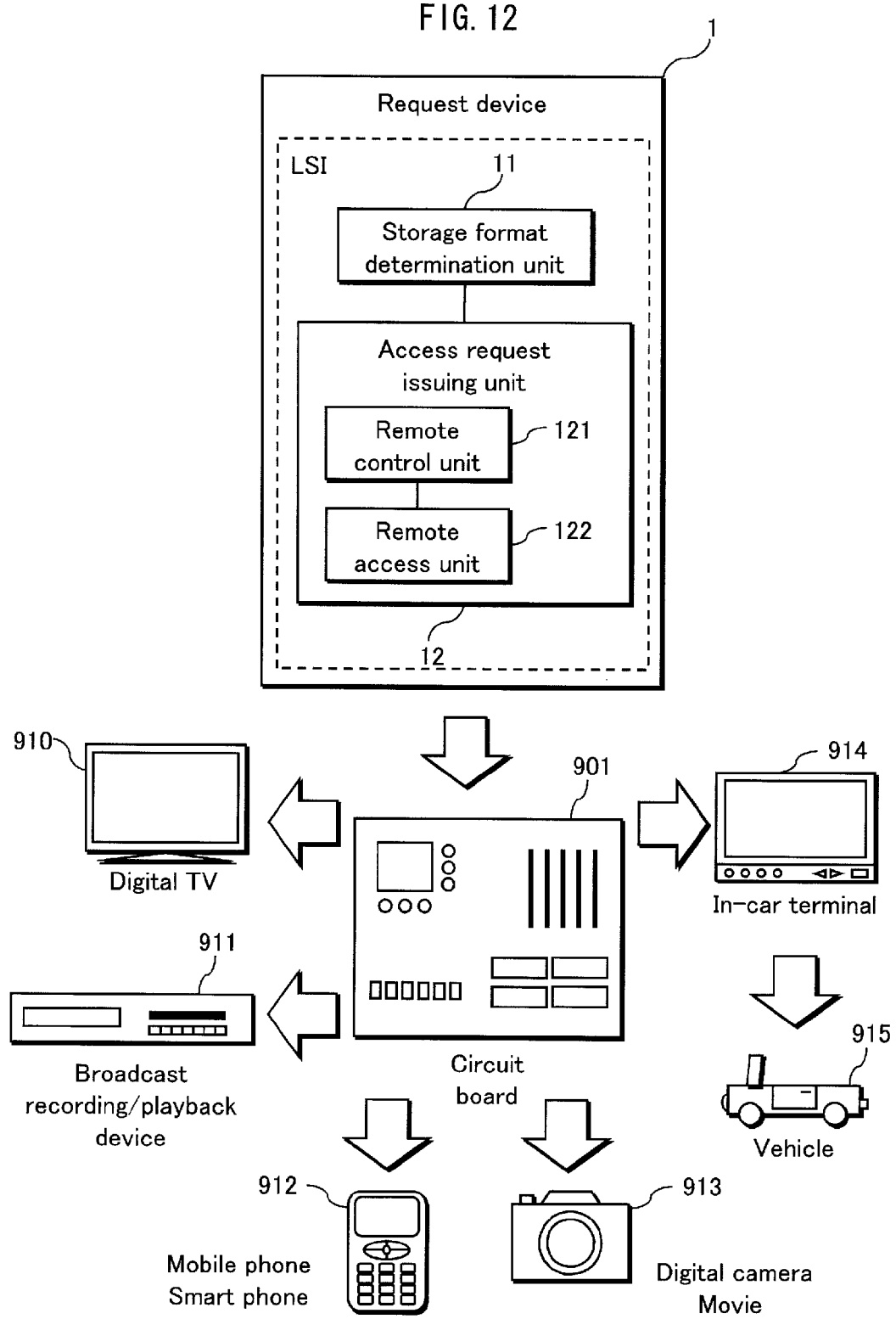

RESPONSE DEVICE, INTEGRATED CIRCUIT OF SAME, RESPONSE METHOD, AND RESPONSE SYSTEM

TECHNICAL FIELD

The present invention relates to inter-device communication technology used to access a data storage unit included in another device, and in particular to improvement in a device including a data storage unit accessed by another device.

BACKGROUND ART

In recent years, a device coordination use case in which a recording device, such as a BD (Blu-ray Disc) recorder, and a mobile terminal, such as a mobile phone, are connected with each other by a USB cable and recorded content within the BD recorder is transferred to the mobile terminal has become popular. A resolution provided by a display screen of a mobile terminal is expected to become higher, and thus quality of transferred content is expected to become higher. As a result, volume of transferred data is expected to become larger.

In the device coordination use case, it is desirable to shorten time required for transfer as much as possible and to enhance convenience at the time of connecting devices, in terms of usability. In order to respond to higher quality of content and larger volume of data, a recording medium for a high-speed I/F with transfer performance of a few Gbps, such as an SDXC memory card, and high-speed wireless transmission technology with communication performance of a few Gbps, such as WiGig (Wireless Gigabit), are required.

Also, in order to increase throughput by making use of features of such super high-speed transmission path technology, a transfer system with a low CPU load pertaining to transfer is necessary.

As an example of a conventional transfer system with a low CPU load pertaining to transfer, Patent Literature 1 discloses a method and a system for implementing iSCSI (internet Small Computer System Interface) with a low load by RNIC (RDMA-enabled Network Interface Controller) mechanisms used for RDMA (Remote Direct Memory Access) functions.

In this method, by utilizing the RNIC mechanisms used for the RDMA functions, overhead attributable to TCP/IP in data transfer using iSCSI is reduced. More specifically, by processing data movement using iSCSI as direct transfer to a memory using RNIC, overhead attributable to iSCSI and TCP/IP protocol processing necessary for the above-mentioned processing is avoided.

CITATION LIST

Patent Literature

[Patent Literature 1]
Japanese Patent Application Publication No. 2008-529109

SUMMARY OF INVENTION

Technical Problem

A recording device, such as a BD recorder, and a mobile terminal, such as a mobile phone, each include at least a communication unit configured to perform communication, a data storage unit configured to store data therein and a control unit configured to control the communication unit and the data storage unit. Given that these devices are computers in each of which a control unit including a CPU performs overall control over a device, technology disclosed in Patent Literature 1 is applicable to these devices by applying RNIC to the communication unit.

When data transfer is performed based on the technology disclosed in Patent Literature 1, however, RNIC directly reads and writes data from and to a memory to avoid a CPU load. In order to prevent memory loss caused by a CPU accessing the memory without detecting memory modification, it becomes necessary to reserve a memory area tied to a tag called STag for each data transfer processing, and to share the information. In addition, since RNIC cannot directly read and write data from and to the data storage unit even though the data is to be recorded on the data storage unit, it becomes necessary to directly transfer the data to the memory, and then to cause the CPU and device driver software to write the data to the data storage unit. As a result, processing overhead is incurred before and after data transfer, preventing an increase in throughput.

In addition, iSCSI uses TCP/IP layer protocol to perform communication between devices. Therefore, if processing of a TCP/IP layer is performed in software, processing overhead is incurred due to an operation of the device driver software and use of the memory. In order to avoid the processing overhead, hardware implementation for TCP/IP processing or similar implementation becomes necessary. In Patent Literature 1, the processing overhead is avoided by assuming RNIC being hardware implementation for TCP/IP processing. This, however, results in an increase in cost of devices for RDMA.

The present invention has been conceived in view of the above problem. A purpose of the present invention is to provide a response device, an integrated circuit of the same, a response method and a response system which do not assume specific protocol so that the processing overhead and a cost increase caused by hardware implementation are avoided and which achieve data transfer that does not require prior reservation of a memory area.

Solution to Problem

One aspect of the present invention is a response device that responds to a request from a request device, comprising: a communication unit configured to perform communication with the request device; a data storage unit configured to store data therein; a control unit configured to control the communication unit and the data storage unit; and a request determination unit configured to determine whether or not the request from the request device is a direct transfer request to directly transfer data to or from the data storage unit, wherein when the request determination unit determines affirmatively, the control unit assigns a right to access the data storage unit to the communication unit, and the communication unit directly transfers, to the data storage unit, an access command and data pertaining to the access command issued from the request device to the data storage unit.

Advantageous Effects of Invention

According to the above-mentioned configuration, when the direct transfer request to directly transfer data to or from the data storage unit is received from the request device, the response device performs a simple control operation so that data is directly transferred between the communication unit and the data storage unit. Such an operation allows the request device to transparently and directly access the data storage unit included in the response device, eliminates the need to reserve a memory area for access each time the request device accesses the data storage unit as the control unit does not have to perform transfer, reduces processing overhead pertaining to transfer between the request device and the response device, and increases throughput of data transfer.

Also, according to the above-mentioned configuration, as for communication performed between the request device and the response device, the control unit does not perform transfer. Therefore, the iSCSI technology is not used and the TCP/IP layer protocol is not necessarily assumed. Since there is no need to implement TCP/IP layer processing in hardware or a similar system, the implementation cost can be reduced.

In the response device pertaining to the present invention, when the request determination unit determines negatively, the control unit may not assign the right to access the data storage unit to the communication unit.

According to this configuration, when the direct transfer request to directly transfer data to or from the data storage unit is not received from the request device, the control unit has the right to access the data storage unit, and thus the response device is allowed to access the data storage unit. Therefore, the data storage unit is efficiently shared between the request device and the response device.

Also, in the response device pertaining to the present invention, the control unit may have a right to access the communication unit and the data storage unit when the direct transfer is not performed.

According to this configuration, since the request device is allowed to perform direct control over the data storage unit via the communication unit while the request device accesses the data storage unit via the communication unit, the request device can efficiently access the data storage unit. Since the response device is allowed to access the data storage unit via the control unit when the direct transfer is not performed, it is possible to avoid the request and response devices competing against each other to access the communication unit and the data storage unit.

Also, in the response device pertaining to present invention, the communication unit may include a direct transfer judgment unit configured to judge whether or not data received from the request device is to be transferred to the data storage unit, and, when the direct transfer judgment unit judges affirmatively, the communication unit may directly transfer the received data to the data storage unit, and, when the direct transfer judgment unit judges negatively, the communication unit may not directly transfer the received data to the data storage unit.

According to this configuration, it is possible to judge whether the communication unit should dynamically transfer each data received from the request device to the data storage unit. Therefore, it is possible to prevent such malfunction that data that should not be transferred to the data storage unit and data that does not have to be transferred to the data storage unit are transferred to the data storage unit.

Also, in the response device pertaining to present invention, the communication unit may include a received data formatting unit configured to format data received from the request device according to a data format recognizable by the data storage unit.

According to this configuration, it is possible to prevent such malfunction that the communication unit transfers the data received from the request device in a format unrecognizable by the data storage unit.

Also, in the response device pertaining to the present invention, the communication unit may include a transmitted data formatting unit configured to format data directly transferred from the data storage unit so that the directly transferred data is in a data format suitable for transmission to the request device.

According to this configuration, it is possible to prevent such malfunction that the communication unit transfers the data directly transferred from the data storage unit in a format unrecognizable by the request device.

Also, in the response device pertaining to the present invention, the control unit may include a condition set unit configured to provide setting of a condition for continuing the direct transfer for one of the communication unit and the data storage unit, and, when the request determination unit determines affirmatively, the condition set unit may set the condition for continuing the direct transfer, and, when the condition for continuing the direct transfer is not met, the one of the communication unit and the data storage unit may terminate the direct transfer.

According to this configuration, since the condition set unit appropriately sets the condition for continuing the direct transfer according to the direct transfer request from the request device each time the direct transfer is performed, it is possible to prevent waste of time during the direct transfer.

Also, in the response device pertaining to the present invention, the condition for continuing the direct transfer may be that a period of the direct transfer is equal to or shorter than a predetermined period.

According to this configuration, since the period of the direct transfer is managed using a transfer elapsed time according to the direct transfer request from the request device each time the direct transfer is performed, the response device is allowed to access the data storage unit after the period has elapsed.

Also, in the response device pertaining to the present invention, the condition for continuing the direct transfer may be that a size of directly transferred data is equal to or smaller than a predetermined size.

According to this configuration, since the period of the direct transfer is managed using the size of transferred data according to the direct transfer request from the request device each time the direct transfer is performed, it is possible to terminate the direct transfer immediately after data of a required size is directly transferred.

Also, in the response device pertaining to the present invention, the condition for continuing the direct transfer may be that a predetermined token is not detected from transferred data.

According to this configuration, since the direct transfer is managed so as to be continued until the predetermined token is detected according to the direct transfer request from the request device each time the direct transfer is performed, it is possible to terminate the direct transfer in accordance with a timing suitable for the request device.

Also, in the response device pertaining to the present invention, the communication unit may include a direct transfer termination unit configured to terminate the direct transfer according to a predetermined condition for terminating the direct transfer, and the predetermined condition may be set before the control unit receives the direct transfer request.

According to this configuration, since there is no need to control the period of the direct transfer according to the direct transfer request from the request device each time the direct transfer is performed, processing overhead pertaining to the control over the period is reduced.

Also, in the response device pertaining to the present invention, the predetermined condition may be that a period of the direct transfer exceeds a predetermined period.

According to this configuration, the period of the direct transfer is managed using the predetermined period, regardless of the direct transfer request from the request device.

Also, in the response device pertaining to the present invention, the predetermined condition may be that a size of directly transferred data exceeds a predetermined size.

According to this configuration, the period of the direct transfer is managed so that the direct transfer is performed until the size of directly transferred data exceeds the predetermined size, regardless of the direct transfer request from the request device.

Also, in the response device pertaining to the present invention, the predetermined condition may be that a predetermined token is detected from transferred data.

According to this configuration, the period of the direct transfer is managed so that the direct transfer is performed until the predetermined token is detected, regardless of the direct transfer request from the request device.

Also, in the response device pertaining to the present invention, the request determination unit may include a validity determination unit configured to determine whether or not the direct transfer request is valid, and, only when the request determination unit determines affirmatively and the validity determination unit determines affirmatively, the control unit may perform control so that data is directly transferred between the communication unit and the data storage unit.

According to this configuration, since a wrong request such as a direct transfer request to directly transfer data to or from a data storage unit not included in the response device and a malicious direct transfer request are rejected, it is possible to ensure robustness and safety for access to the data storage unit.

Also, in the response device pertaining to the present invention, the control unit, the communication unit and the data storage unit may be connected with one another so as to form a ring.

According to this configuration, when the control unit, the communication unit and the data storage unit are connected with one another, the cost pertaining to the connection is reduced, compared to the cost required when a hub and star topology, or daisy chain topology is used.

Also, in the response device pertaining to the present invention, the request device may include an access request issuing unit configured to issue the access command according to an access format defined by the data storage unit.

According to this configuration, since the request device issues the access command in advance according to the access format defined by the data storage unit, processing overhead pertaining to the formatting of the access command performed by the response device according to the access format defined by the data storage unit is reduced.

Also, in the response device pertaining to the present invention, the request device may include a storage format determination unit configured to determine a storage format used in the data storage unit.

According to this configuration, since the request device determines the storage format defined by the data storage unit, processing overhead pertaining to the determination of the storage format defined by the data storage unit is reduced.

Another aspect of the present invention is an integrated circuit that responds to a request from a request device, comprising: a request determination unit configured to determine the request from the request device; a communication unit configured to perform communication with the request device; a data storage unit configured to store data therein; and a control unit configured to control the communication unit and the data storage unit, and, when the request determination unit determines that the request from the request device is a direct transfer request to directly transfer data to or from the data storage unit, the control unit assigns a right to access the data storage unit to the communication unit, and the communication unit directly transfers, to the data storage unit, an access command and data pertaining to the access command issued from the request device to the data storage unit.

According to this configuration, miniaturization is achieved using the integrated circuit.

Yet another aspect of the present invention is a response method used in a response device that responds to a request from a request device, the response device including: a communication unit configured to perform communication with the request device; a data storage unit configured to store data therein; and a control unit configured to control the communication unit and the data storage unit, the response method comprising: a request determination step of determining the request from the request device, wherein when the request determination step determines that the request from the request device is a direct transfer request to directly transfer data to or from the data storage unit, the control unit assigns a right to access the data storage unit to the communication unit, and the communication unit directly transfers, to the data storage unit, an access command and data pertaining to the access command issued from the request device to the data storage unit.

According to this configuration, the present invention is implemented in software such as a program.

Yet another aspect of the present invention is a response system composed of a request device and a response device that responds to a request from the request device, wherein the response device includes: a communication unit configured to perform communication with the request device; a data storage unit configured to store data therein; a control unit configured to control the communication unit and the data storage unit; and a request determination unit configured to determine whether or not the request from the request device is a direct transfer request to directly transfer data to or from the data storage unit, and, when the request determination unit determines affirmatively, the control unit assigns a right to access the data storage unit to the communication unit, and the communication unit directly transfers, to the data storage unit, an access command and data pertaining to the access command issued from the request device to the data storage unit, and the request device includes an access request issuing unit configured to issue the access command according to an access format defined by the data storage unit.

According to this configuration, since the request device issues the access command in advance according to the access format defined by the data storage unit, and the response device performs a simple control operation so that data is directly transferred between the communication unit and the data storage unit when the direct transfer request to directly transfer data to or from the data storage unit is received from the request device, the request device can transparently and directly access the data storage unit.

BRIEF DESCRIPTION OF DRAWINGS

FIG. 12 is a conceptual diagram of an example in which the request device pertaining to the present embodiment is adapted to set products.

DESCRIPTION OF EMBODIMENTS

The following describes an embodiment of the present invention in detail, with reference to the drawings. Note that the same reference signs are assigned to components having the same function in the present description and the drawings, and description of overlapping portions is omitted.

Configuration (1) Overall Configuration of System

Figure 1:
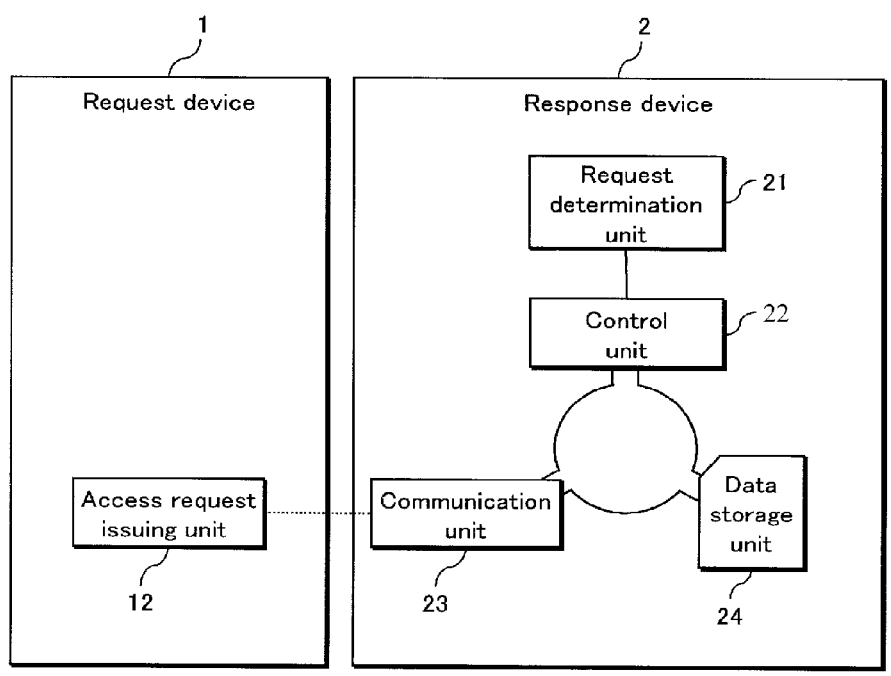
FIG. 1 illustrates an overall system including a response device pertaining to the present embodiment.

FIG. 1 is a block diagram illustrating main components of an overall system including a response device pertaining to the present embodiment.

A response device 2 includes a request determination unit 21, a control unit 22, a communication unit 23 and a data storage unit 24.

The control unit 22, the communication unit 23 and the data storage unit 24 are connected with one another via a serial link so as to form a ring. The control unit 22 is further connected with the request determination unit 21.

A request device 1 includes an access request issuing unit 12.

The request device 1 and the response device 2 are capable of communicating with each other via the access request issuing unit 12 and the communication unit 23.

(2) Response Device 2

Figure 2:
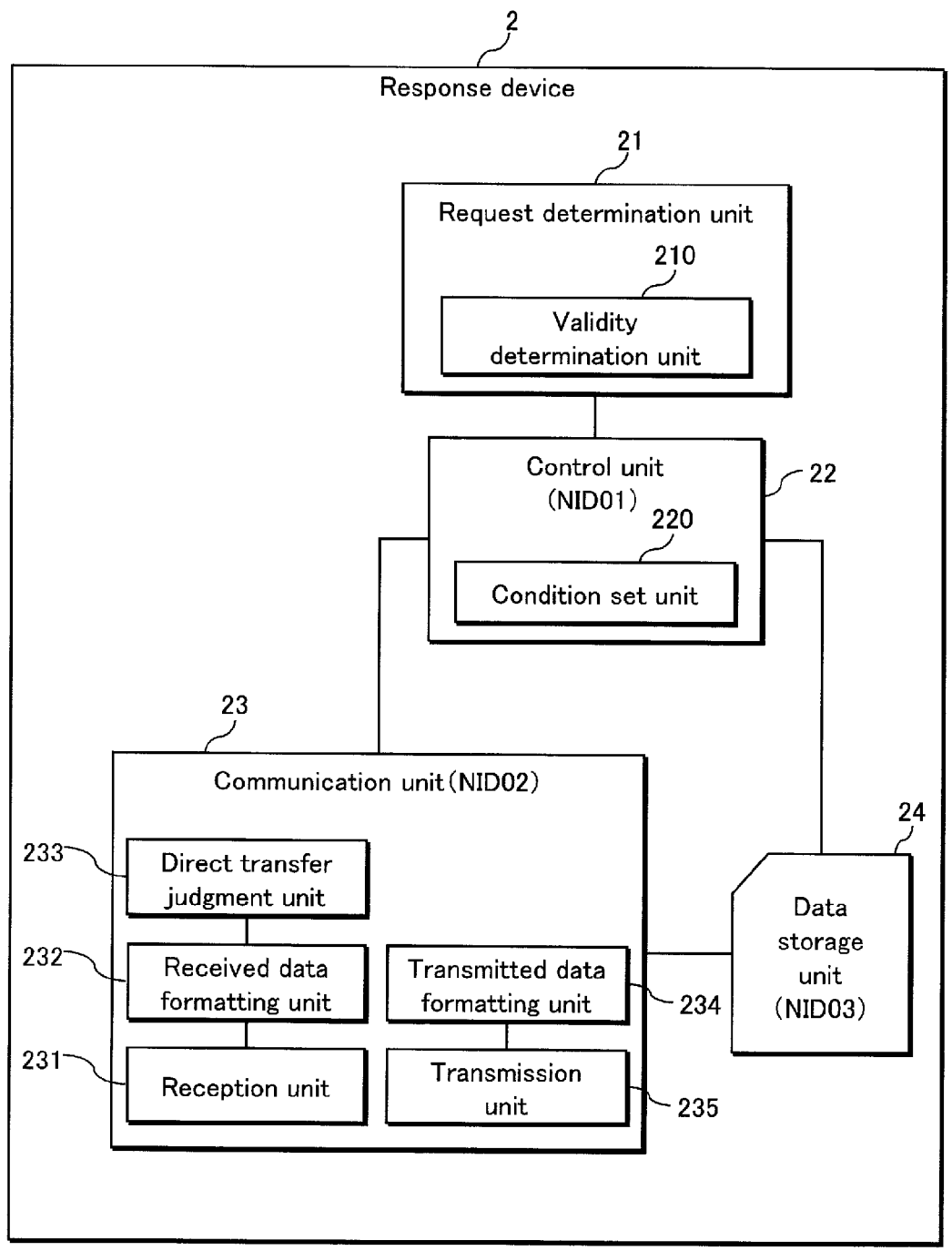
FIG. 2 is a block diagram of the response device pertaining to the present embodiment.

FIG. 2 illustrates a detailed configuration of the response device 2.

The response device 2 pertaining to the present embodiment is embodied as a part of a mobile terminal such as a smart phone and a tablet terminal.

In the present embodiment, the control unit 22, the communication unit 23 and the data storage unit 24 included in the response device 2 are connected with one another via a serial link so as to form a ring as illustrated in FIG. 2, and each have a unique node ID. Here, node IDs unique to the control unit 22, the communication unit 23 and the data storage unit 24 are respectively NID01, NID02 and NID03. A transfer direction on the serial link is fixed to a clockwise direction in FIG. 2. Therefore, for example, when the communication unit 23 transmits data to the data storage unit 24, the data is transferred via the control unit 22. In this case, however, the control unit 22 is only part of a path. Therefore, the control unit 22 does not have to functionally operate, and have only to function as a transmission path from the communication unit 23 to the data storage unit 24. In addition, in a case where a direct transfer mode is not set, access to the communication unit 23 and the data storage unit 24 is provided via the control unit 22 at any time, similarly to a conventional device. In this case, the control unit 22 performs processing such as determination of data transmission destination at all times, and the communication unit 23 and the data storage unit 24 each have direct access only to the control unit 22.

The request determination unit 21 determines whether or not a request received from the request device 1 via the communication unit 23 is a direct transfer request to directly transfer data to or from the data storage unit. When determining that the request is the direct transfer request to directly transfer data to or from the data storage unit 24, the request determination unit 21 instructs the control unit 22 to set a direct transfer mode between the communication unit 23 and the data storage unit 24. The request determination unit 21 determines whether or not the request is the direct transfer request to directly transfer data to or from the data storage unit 24 by determining whether or not transferred data is direct transfer request data including a device ID of the request device 1 and specifying the data storage unit 24 as an access target.

The request determination unit 21 is embodied, for example, as a CPU, a main memory and software operating using the CPU and the main memory.

Here, the request determination unit 21 includes a validity determination unit 210.

The validity determination unit 21 determines validity of the request received from the request device 1. Therefore, when the request received from the request device 1 is the direct transfer request to directly transfer data to or from the data storage unit 24, the control unit 22 is instructed to set the direct transfer mode if the validity determination unit 210 determines that the request is valid, and the control unit 22 is not instructed to set the direct transfer mode if the validity determination unit 210 determines that the request is invalid.

Here, the validity is determined by checking a device ID registered in advance. For example, when a device ID of the request device 1 is TID01, the validity is determined by checking whether or not the device ID is registered with the validity determination unit 210. That is to say, the request is determined to be valid if TID01 is registered with the validity determination unit 210, and is determined to be invalid if TID01 is not registered with the validity determination unit 210.

The control unit 22 is provided to control the communication unit 23 and the data storage unit 24, and is embodied, for example, as an SDXC host controller and device driver software corresponding to each of the communication unit 23 and the data storage unit 24. Furthermore, the control unit 22 provides setting of the direct transfer mode between the communication unit 23 and the data storage unit 24 for the communication unit 23 and the data storage unit 24, according to the instructions from the request determination unit 21. In a state where the direct transfer mode is not initiated, any resources within the response device 2 are allowed to access resources such as the communication unit 23 and the data storage unit 24 only via the control unit 22. In the present embodiment, however, while a resource within the response device 2 such as a CPU accesses the data storage unit 24, the control unit 22 waits for the end of the access processing and then sets the direct transfer mode. Once the direct transfer mode is set, resources other than the request device 1 are not allowed to access the data storage unit 24 until the direct transfer mode ends because the control unit 22 stops relaying the access processing.

Here, the control unit 22 includes a condition set unit 220.

The condition set unit 220 sets a condition for continuing the direct transfer mode when the direct transfer mode is set. In the present embodiment, a size of data to be directly transferred is included in the direct transfer request data, and this value is set as the condition for continuing the direct transfer mode.

The communication unit 23 is provided in order for the response device 2 to perform communication with another device such as a request device, and is, for example, an NIC (Network Interface Card). Specifically, the communication unit 23 is embodied as a WiGig communication device having an SDXC interface.

Here, the communication unit 23 includes a reception unit 231, a received data formatting unit 232, a direct transfer judgment unit 233, a transmitted data formatting unit 234 and a transmission unit 235.

The reception unit 231 receives a communication frame transmitted from another terminal to the response device.

The received data formatting unit 232 removes an information portion necessary for communication, such as an MAC header, from the communication frame received by the reception unit 231 to extract a data portion.

The direct transfer judgment unit 233 analyzes the data portion extracted by the received data formatting unit 232, and judges whether the data portion is to be directly transferred to the data storage unit 24 or is to be transferred to the control unit 22.

Here, the judgment pertaining to the present embodiment is made based on an ID of a transmission source and a data type. That is to say, in a case where the ID of a transmission source is the request device 1 (TID01) and the data type is an access command or data to be transferred to the data storage unit 24, the data portion is judged to be directly transferred. In other cases, the data portion is not judged to be directly transferred. Examples of the other cases are a case where the data portion is a message requesting the control unit 22 to terminate the direct transfer or a message notifying the communication unit 23 of the completion of the direct transfer and a case where the data portion is received after the condition for continuing the direct transfer mode is not met.

A node ID of a transfer destination is inserted into the data portion according to the result of the judgment, and resulting data is transferred to the transfer destination. The node ID of the transfer destination has been acquired at the time of setting pertaining to the direct transfer. Details thereof are described later. For example, when the result of the judgment indicates direct transfer to the data storage unit 24, NID03 is set as the node ID of the transfer destination. On the other hand, when the result of the judgment indicates transfer to the control unit 22, NID01 is set as the node ID of the transfer destination.

The transmitted data formatting unit 234 adds an information portion necessary for communication with another terminal, such as an MAC header, to data transferred from the control unit 22 or the data storage unit 24 to the communication unit 23 to generate a communication frame.

The transmission unit 235 transmits the communication frame generated by the transmitted data formatting unit 234 to another device.

The data storage unit 24 is a non-volatile recording medium which is to be accessed via the control unit 22 or the communication unit 23 and is writable and readable. The data storage unit 24 is embodied, for example, as an SDXC memory card.

(3) Request Device 1

Figure 3:
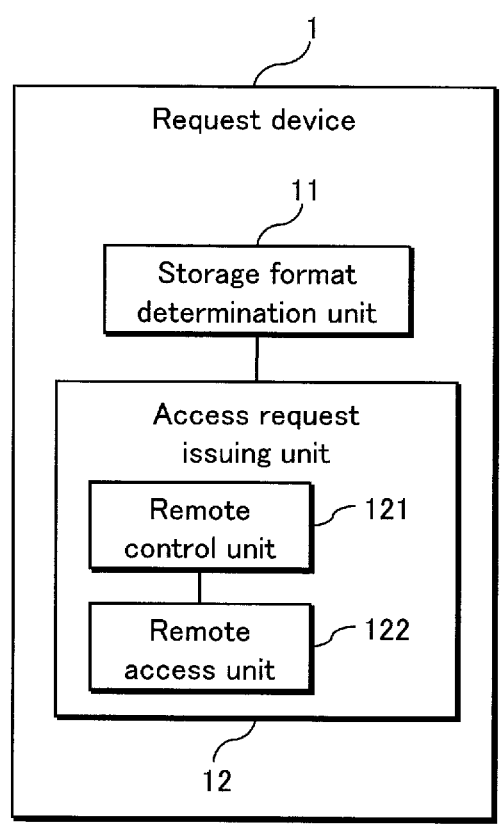
FIG. 3 is a block diagram of a request device pertaining to the present embodiment.

FIG. 3 illustrates a detailed configuration of the request device 1.

The request device 1 pertaining to the present embodiment is embodied, for example, as a part of a recording device such as a BD recorder.

The request device 1 includes a storage format determination unit 11 and the access request issuing unit 12.

When the request device 1 accesses the data storage unit 24 included in the response device 2, the storage format determination unit 11 determines, from a first access command, a storage format used in the data storage unit 24, and performs control to read desired data stored in the data storage unit 24 or to write desired data to the data storage unit 24. The determined storage format is used by application software of the request device 1 to access the data storage unit. Here, the storage format is, for example, a file system, and is more specifically exFAT in a case where the data storage unit 24 is an SDXC memory card.

The access request issuing unit 12 issues, to the response device 2, the direct transfer request to directly transfer data to or from the data storage unit 24, and an access command to access the data storage unit 24.

Here, the access request issuing unit 12 includes a remote control unit 121 and a remote access unit 122.

The remote control unit 121 generates the direct transfer request data for the data storage unit 24, and the access command to access the data storage unit 24 to be transmitted to the response device 2.

In order to generate the access command to access the data storage unit 24, it is desirable that the remote control unit 121 directly function as a host controller for the data storage unit 24. Therefore, for example, when the data storage unit 24 is an SDXC memory card, it is desirable that the remote control unit 121 include an SDXC host controller and software for controlling the SDXC host controller, such as a device driver.

The remote access unit 122 transmits the direct transfer request data and the access command generated by the remote control unit 121 to the response device 2, and transmits and receives data to and from the response device 2 in accordance with a transaction conducted due to issuing of a command.

The remote access unit 122 also functions as a communication unit configured to perform communication with the response device 2. Therefore, the remote access unit 122 is required to perform communication according to the same standards as the communication unit 23 included in the response device 2. Accordingly, for example, when the communication unit 23 is a device supporting WiGig communication, the remote access unit 122 is required to include a device function supporting WiGig communication.

Operations

The following describes a series of operations performed between the request device 1 and the response device 2 pertaining to the present embodiment, based on a configuration example described above.

(1) Overview of Operation of Overall System

Figure 4:
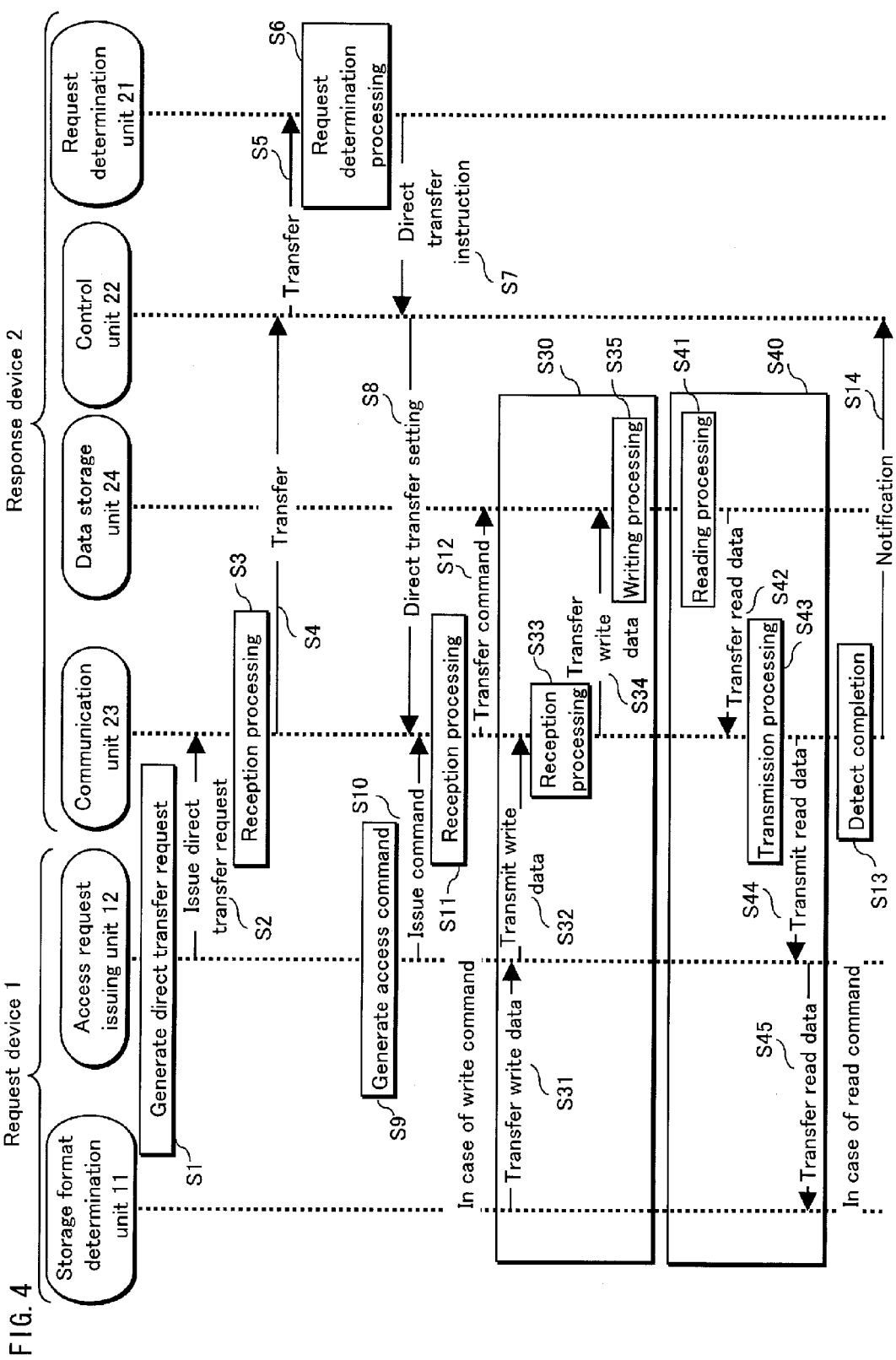
FIG. 4 illustrates a series of operations performed between the request device and the response device pertaining to the present embodiment.

FIG. 4 illustrates an overview of an operation of an overall system pertaining to the present embodiment.

The following describes the operation of the overall system pertaining to the present embodiment based on FIG. 4.

In order for the access request issuing unit 12 included in the request device 1 to request access to the data storage unit 24 included in the response device 2 to perform direct transfer, the remote control unit 121 generates the direct transfer request (S1).

The direct transfer request may include a device ID of the request device 1, information concerning the transfer, the condition for continuing the direct transfer and the like.

Once the direct transfer request is generated, the remote access unit 122 included in the access request issuing unit 12 performs transmission processing such as addition of an MAC header and the like, and transmits the direct transfer request to the response device 2 as a communication frame (S2).

The direct transfer request is received by the communication unit 23 included in the response device 2, and reception processing such as a check and removal of the MAC header included in the communication frame is performed (S3).

The communication unit 23 transfers data resulting from the reception processing to the control unit 22 (S4).

The control unit 22 further transfers the data to the request determination unit 21 to check whether or not the direct transfer setting is necessary (S5).

The request determination unit 21 checks the transferred data to determine the request. Here, when the request determination unit 21 determines that the request is the direct transfer request to directly transfer data to or from the data storage unit 24, the validity determination unit 210 determines the validity of the request. The device ID of the request device 1 is registered in advance with the validity determination unit 210, and the validity determination unit 210 determines the validity of the request by checking whether or not the device ID included in the transferred data matches the registered device ID (S6).

In the present embodiment, the request is determined to be valid, and the request determination unit 21 instructs the control unit 22 to initiate the direct transfer (S7).

The control unit 22 instructed to initiate the direct transfer provides setting pertaining to the direct transfer for the communication unit 23 (S8).

The setting pertaining to the direct transfer is provided by notifying, to the communication unit 23, a node ID of the data storage unit 24 as a partner for direct transfer, namely NID03, and similarly notifying, to the data storage unit 24, a node ID of the communication unit 23 as a partner for direct transfer, namely NID02. Until the communication unit 23 notifies the control unit 22 that the condition for continuing the direct transfer (described later) is not met, the control unit 22 assigns a right to access the data storage unit 24 to the communication unit 23, so that the control unit 22 does not access the communication unit 23 and the data storage unit 24 and does not allow other nodes and devices to access the communication unit 23 and the data storage unit 24 via the control unit 22.

The access request issuing unit 12 included in the request device 1 generates the access command to access the data storage unit 24 (S9).

The access request issuing unit 12 transmits the generated access command to the response device 2 as a communication frame (S10).

The communication unit 23 performs the reception processing with respect to the received data, and checks whether or not the received data is to be transferred to the data storage unit 24 (S11).

When the received data is judged to be transferred as a result of the check, the received data is transferred to the data storage unit 24 (S12).

When the transferred access command is a write command, a series of processes in a step S30 are performed.

That is to say, the storage format determination unit 11 transfers, to the access request issuing unit 12, write data according to the storage format used in the data storage unit 24 (S31), the access request issuing unit 12 transfers the write data to the communication unit 23 as a communication frame (S32), the communication unit 23 performs the reception processing with respect to the received write data (S33) and transfers the write data resulting from the reception processing to the data storage unit 24 (S34), and the data storage unit 24 writes thereto the write data (S35).

When the transferred access command is a read command, a series of processes in a step S40 are performed.

That is to say, the data storage unit 24 reads therefrom data (S41) and transfers the read data to the communication unit 23 (S42), the communication unit 23 performs the transmission processing with respect to the transferred data (S43) and transmits generated data to be transmitted to the request device 1 as a communication frame (S44), and the access request issuing unit 12 performs the reception processing with respect to the received data and transfers extracted data to the storage format determination unit 11 (S45).

When the series of processes in a step S30 or S40 are completed, the communication unit 23 checks whether or not the condition for continuing the direct transfer is met (S13).

When the condition for continuing the direct transfer is not met, the communication unit 23 notifies the control unit 22 accordingly to return the right to access the data storage unit 24 (S14). The notification is made, for example, by assertion of an interrupt signal. By receiving the notification, the control unit 22 acquires the right to access the data storage unit 24.

When the condition for continuing the direct transfer is met, the series of processes in a step S30 or S40 are repeatedly performed in accordance with a type of a transfer direction of the access command.

In the above-mentioned manner, the request device 1 transparently and directly accesses the data storage unit 24 included in the response device 2.

(2) Operation of Response Device 2

Figure 5:
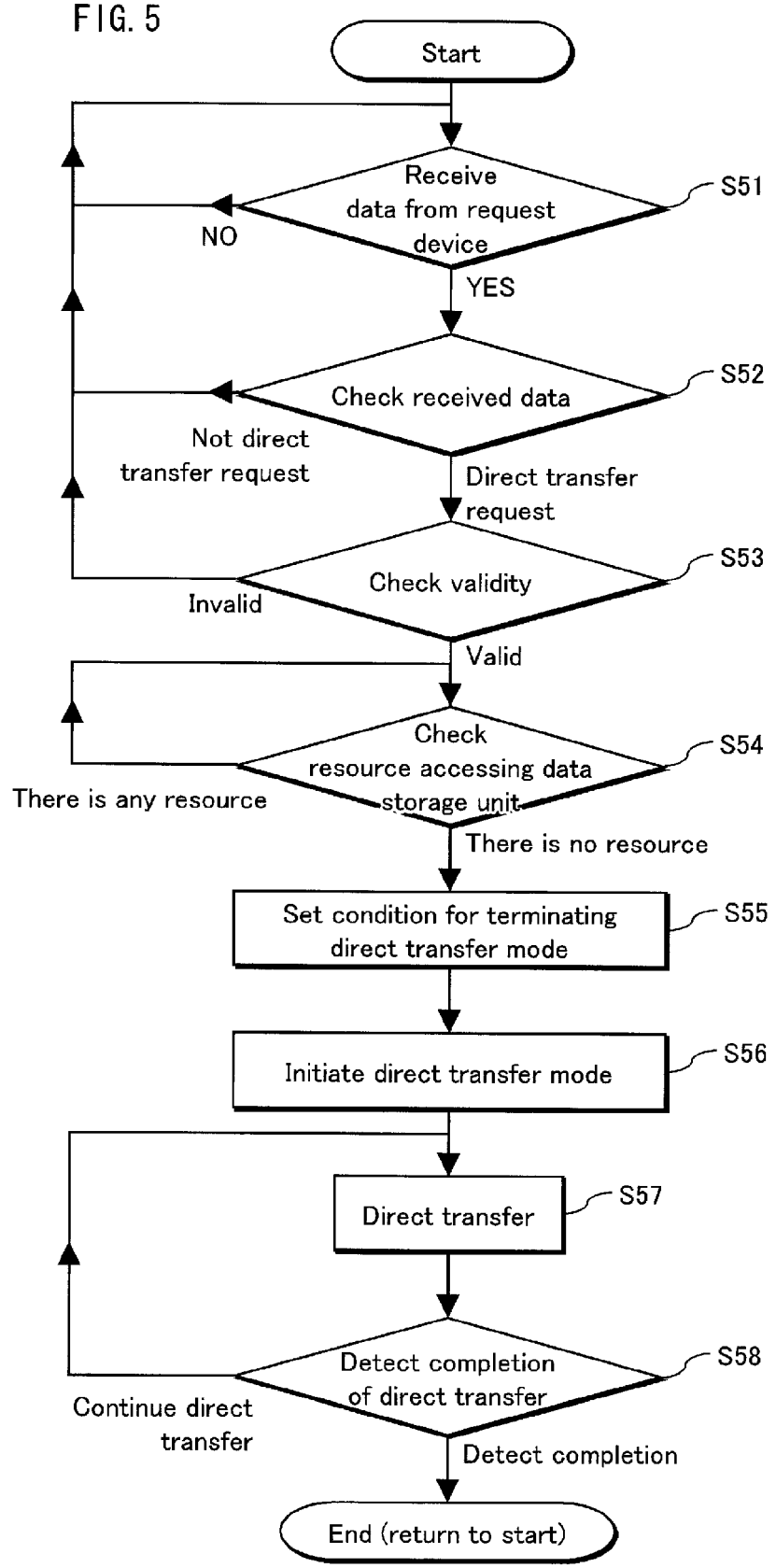
FIG. 5 is a flow chart relating to an outline of an operation of the response device pertaining to the present embodiment.

FIG. 5 is a flow chart showing an operation of the response device 2 pertaining to the present embodiment.

The following describes the operation of the response device 2 pertaining to the present embodiment in detail based on FIG. 5.

As a first step, the response device 2 waits for reception of data transmitted from the request device 1 (S51). Unless data is received, processing remains in this step.

When reception of data is confirmed, the request determination unit 21 checks the received data (S52). The received data is checked according to the operations in the above-mentioned steps S4 to S6. When the received data is not the direct transfer request to directly transfer data to or from the data storage unit 24, processing returns to the step S51. Here, examples of the case where the received data is not the direct transfer request to directly transfer data to or from the data storage unit 24 are a case where the received data is a request not including necessary information such as an ID of the request device 1, a case where the received data is an access request to access a device other than the data storage unit 24, and a case where the received data is an access request to access the data storage unit 24 via the control unit 22.

When the received data is the direct transfer request to directly transfer data to or from the data storage unit, the validity of the request is checked in the next step (S53). The method to check the validity of the request is as described in the step S6. When the request is determined to be invalid as a result of the check, processing returns to the step S51.

When the request is determined to be valid as a result of the check, the control unit 22 checks whether or not there are any resources being accessing the data storage unit 24 in the next step (S54). When it is determined that there are any resources being accessing the data storage unit 24 as a result of the check, processing remains in this step until the access is completed.

When it is determined that there are no resources being accessing the data storage unit 24 as a result of the check, the condition set unit 220 provides setting of a condition for continuing the direct transfer mode for the communication unit 23 (S55). In the present embodiment, assume that the condition for continuing the direct transfer mode is that a size of directly transferred data is smaller than a predetermined size.

After the condition for continuing the direct transfer mode is set, the control unit 22 initiates the direct transfer mode performed between the communication unit 23 and the data storage unit 24 (S56). Operations performed in the direct transfer mode are as described in the above-mentioned step S8, and thus description thereof is omitted here. In the above-mentioned manner, the communication unit 23 and the data storage unit 24 recognize each other as partners for the direct transfer.

When the direct transfer is initiated, it becomes possible to perform the direct transfer between the communication unit 23 and the data storage unit 24. The request device 1 transparently and directly accesses the data storage unit 24 using the mode (S57). Since details of the direct transfer are described in the above-mentioned steps S9 to S12 and the step S30 or S40, description thereof is omitted here. Note that, in the present embodiment, in order to avoid competition to access the data storage unit 24, assume that the control unit 22 is not allowed to access the data storage unit 24 after initiation of the direct transfer until the direct transfer is completed.

During the direct transfer, the communication unit 23 monitors a timing at which the condition for continuing the direct transfer is not met (S58). Since the condition for continuing the direct transfer is that a size of directly transferred data is smaller than the predetermined size in the present embodiments, the communication unit 23 monitors the size of directly transferred data. Until a fact that the condition for continuing the direct transfer is not met is detected, processing in the steps S57 to S58 is repeated. When the fact that the condition for continuing the direct transfer is not met is detected, the control unit 22 is notified accordingly. Since details of the notification are as described in the above-mention step S14, description thereof is omitted here.

In the above-mentioned manner, the response device 2 pertaining to the present embodiment responds to the direct transfer request to directly transfer data to or from the data storage unit 24 from the request device 1, and operates accordingly.

(3) Operation of Communication Unit 23 During Direct Transfer

Figure 6:
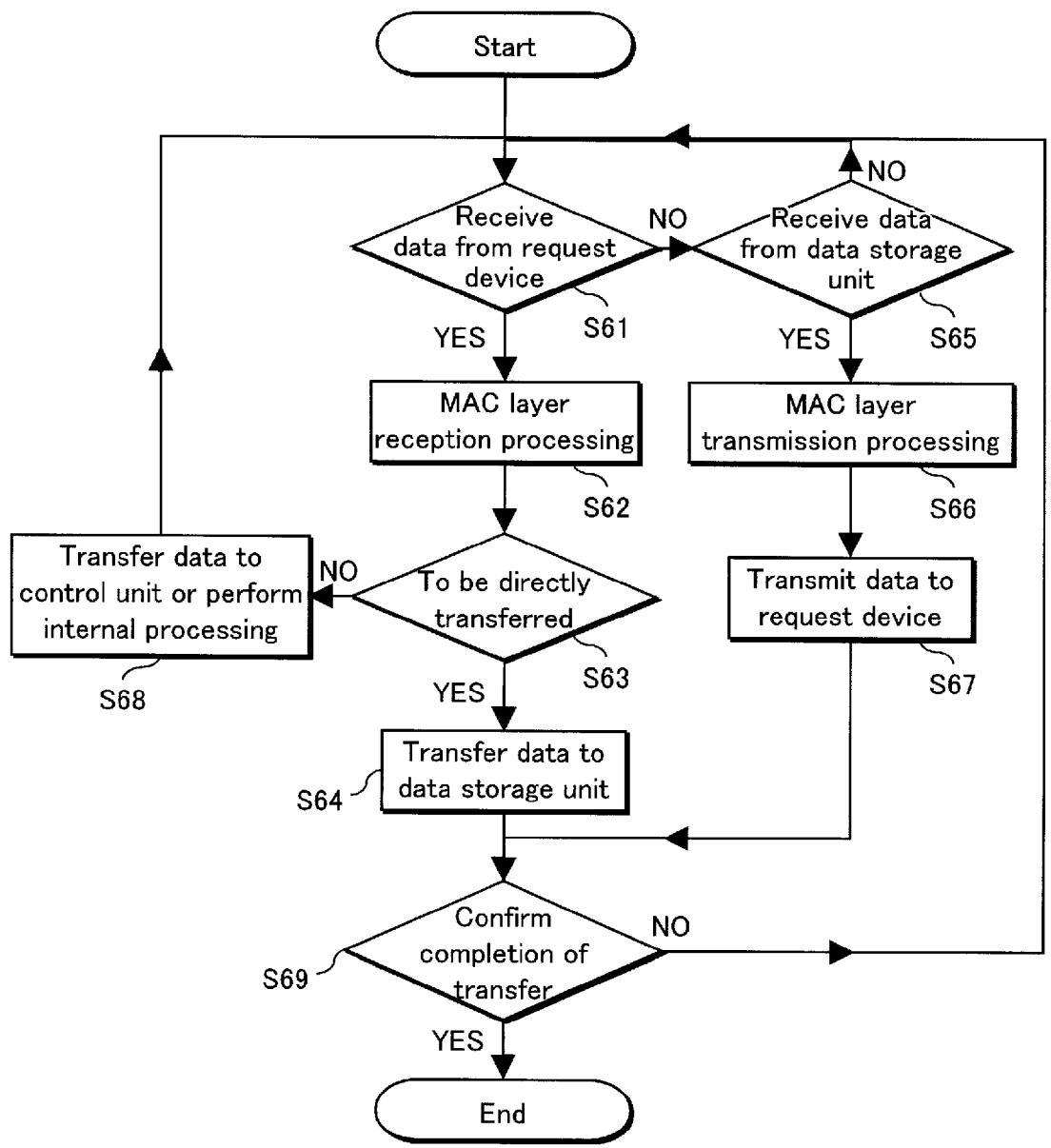
FIG. 6 is a flow chart relating to an operation of a communication unit pertaining to the present embodiment during direct transfer.
Figure 7:
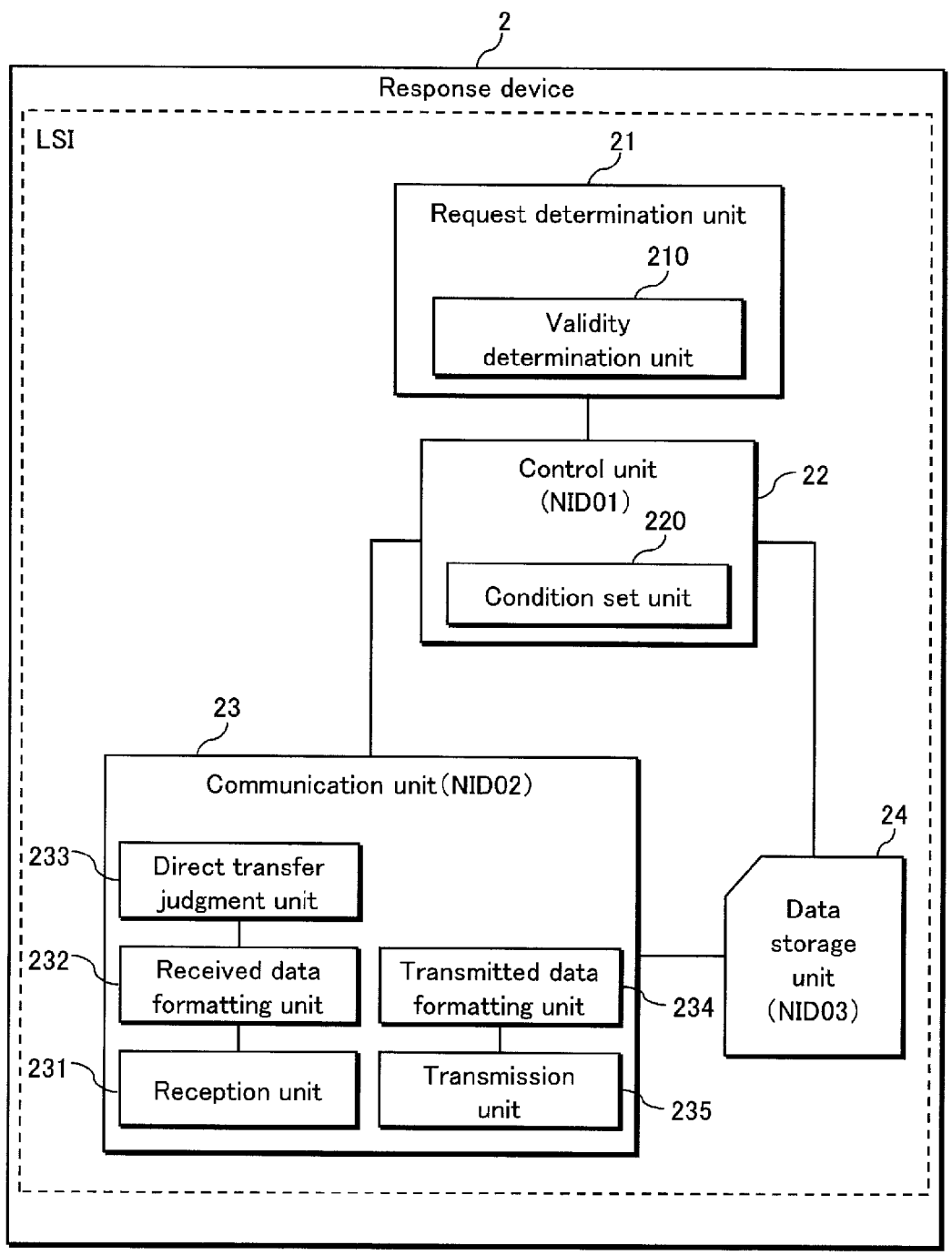
FIG. 7 is a block diagram of the response device pertaining to the present embodiment as an integrated circuit.
Figure 8:
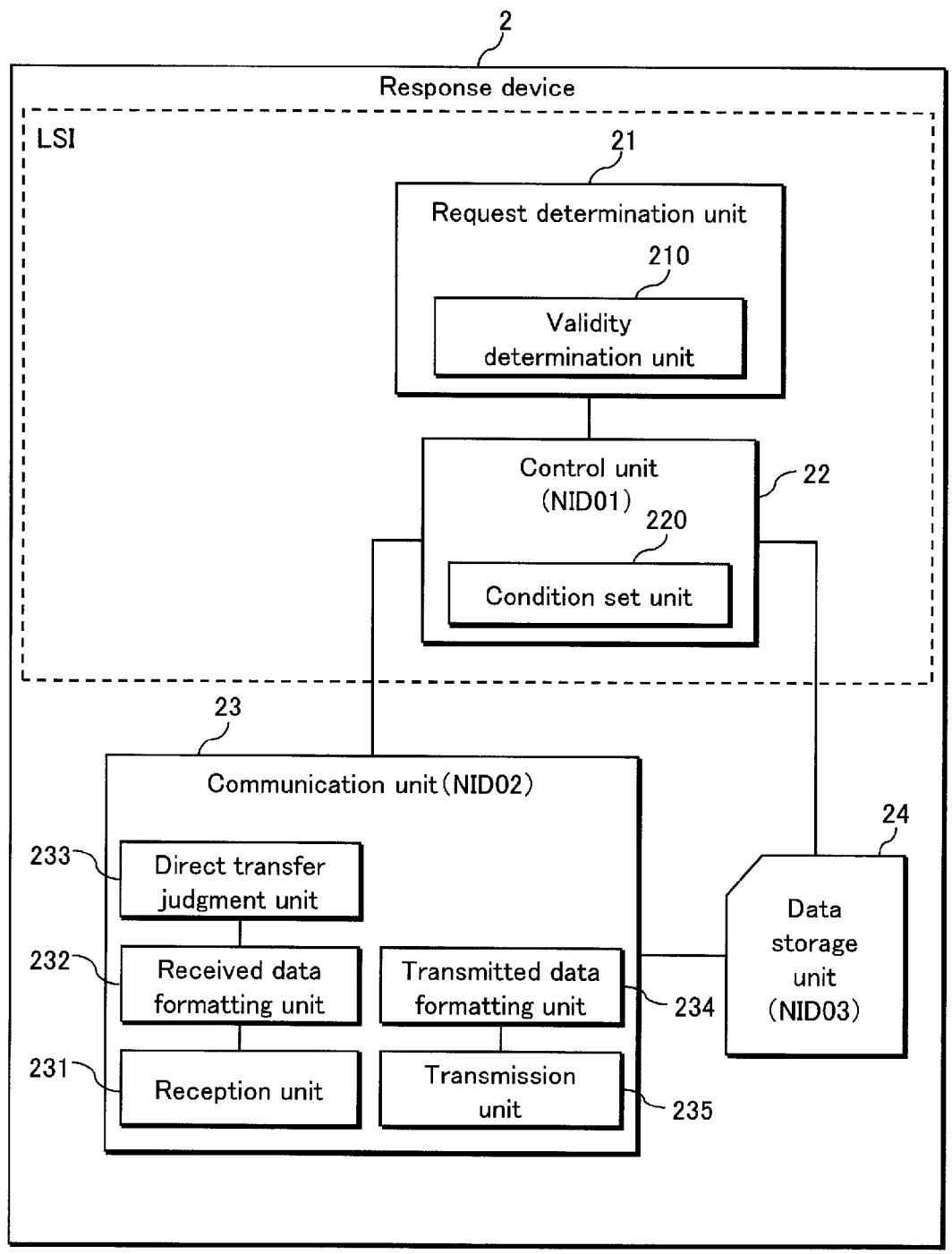
FIG. 8 is a block diagram of the response device pertaining to the present embodiment as a set.
Figure 9:
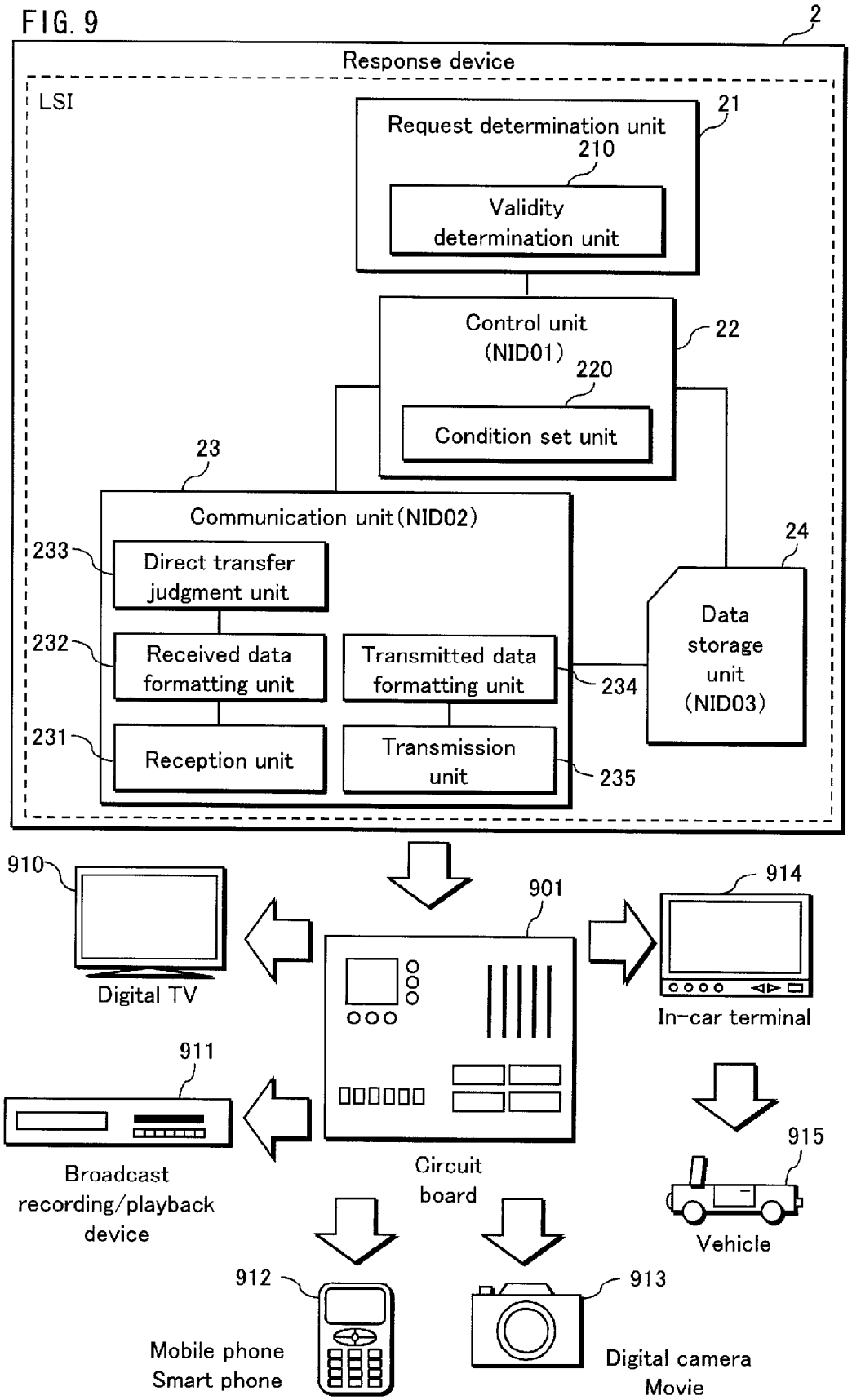
FIG. 9 is a conceptual diagram of an example in which the response device pertaining to the present embodiment is adapted to set products.
Figure 10:
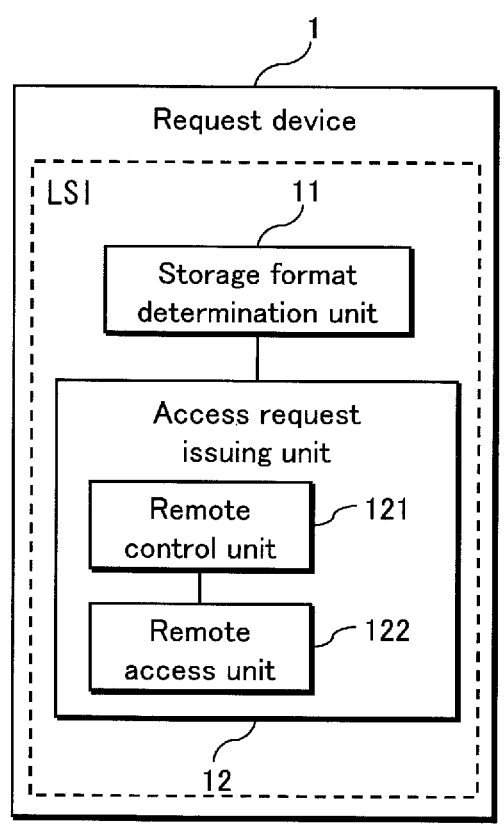
FIG. 10 is a block diagram of the request device pertaining to the present embodiment as an integrated circuit.
Figure 11:
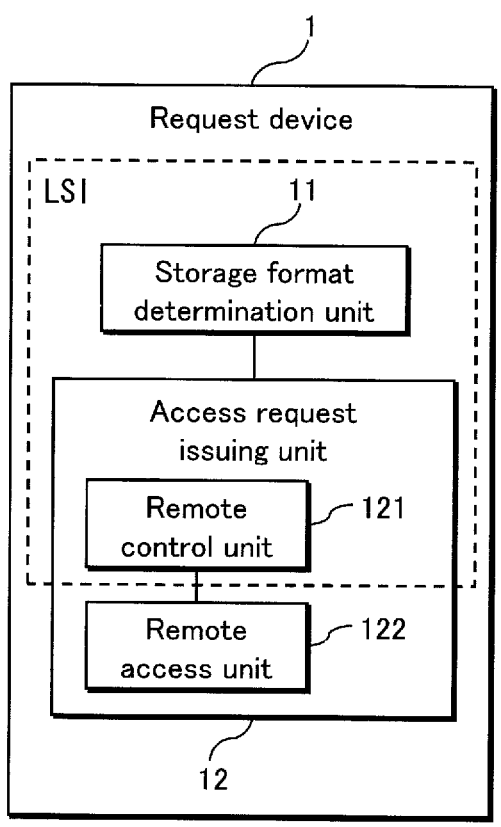
FIG. 11 is a block diagram of the request device pertaining to the present embodiment as a set.

FIG. 6 is a flow chart showing an operation of the communication unit 23 pertaining to the present embodiment during the direct transfer.

The following describes the operation of the communication unit 23 pertaining to the present embodiment during the direct transfer in detail based on FIG. 6.

When the direct transfer mode is initiated, the reception unit 231 included in the communication unit 23 checks whether or not there are any frames received from the request device 1 (S61).

When it is confirmed that there is no received frame, whether or not there is any data transferred from the data storage unit 24 is checked (S65). When there is no data transferred from the data storage unit 24, processing returns to the step S61. When it is confirmed that there is any data transferred from the data storage unit 24, the transmitted data formatting unit 234 generates a frame to be transmitted to the request device 1 based on the transferred data (S66). Here, the generation of data to be transmitted principally indicates transmission processing of a data link layer. Specifically, examples of the transmission processing are addition of an MAC header and calculation of a CRC checksum.

When the frame to be transmitted is generated, the transmission unit 235 transmits the generated frame to the request device 1 (S67).

On the other hand, when the reception unit 231 confirms reception of a frame, the received data formatting unit 232 performs reception processing with respect to the received frame (S62). Here, the reception processing principally indicates reception processing of a data link layer. Specifically, examples of the reception processing are removal of an MAC header and confirmation of a CRC checksum.

When the reception processing with respect to the received frame is completed, the direct transfer judgment unit 233 judges, regarding extracted data, whether the received data is to be directly transferred to the data storage unit 24 (S63).

When the received data is judged not to be directly transferred, the received data is transferred to the control unit 22 or subjected to internal processing within the communication unit 23 in accordance with a type of the received data, and processing returns to the step S61.

When the received data is judged to be directly transferred, the received data is transferred to the data storage unit 24 (S64).

When processing in the step S64 or S67 is completed, whether or not a total size of directly transferred data is smaller than a size of transferred data set by the control unit 22 as the condition for continuing the direct transfer is checked. When the total size of directly transferred data is smaller than the size of transferred data set by the control unit 22 as the condition for continuing the direct transfer, processing returns to the step S61. When the total size of directly transferred data is equal to or larger than the size of transferred data set as the condition for continuing the direct transfer, the control unit 22 is notified accordingly by assertion of an interrupt signal and the like.

The communication unit 23 operates in the above-mentioned manner during the direct transfer.

Summary

According to the present embodiment described above, the response device 2 pertaining to the present invention includes the request determination unit 21, the validity determination unit 210, the control unit 22, the condition set unit 220, the communication unit 23, the reception unit 231, the received data formatting unit 232, the direct transfer judgment unit 233, the transmitted data formatting unit 234, the transmission unit 235 and the data storage unit 24.

In particular, the control unit 22, the communication unit 23 and the data storage unit 24 are connected with one another via a serial link so as to form a ring.

The request device 1 pertaining to the present invention includes the storage format determination unit 11, the access request issuing unit 12, the remote control unit 121 and the remote access unit 122.

The access command and data pertaining to the command transmitted from the request device 1 pertaining to the present invention to the data storage unit 24 are transferred between the communication unit 23 and the data storage unit 24 within the response device 2 so as to be directly recognizable by the data storage unit 24, and are transferred between the remote access unit 122 and the communication unit 23 as a communication frame including the above-mentioned access command and data pertaining to the command in a payload.

With this configuration, the response device 2 can use the data storage unit 24 included therein as a recording medium included therein under a normal condition. When a valid direct transfer request to directly transfer data to or from the data storage unit 24 is made by the request device 1, the direct transfer mode is set between the communication unit 23 and the data storage unit 24 so that the request device 1 can transparently and directly access the data storage unit 24. Since it becomes unnecessary to reserve a memory area in advance and confirm the reservation as in the conventional technology, processing overhead during transfer is reduced and throughput significantly increases.

Also, the request device 1 can transparently and directly access the data storage unit 24 without using any resources other than the communication unit 23 and the data storage unit 24 within the response device 2 after the initiation of the direct transfer until the direct transfer is completed. This can result in a reduction of processing loads of the response device 2 and a reduction of electricity consumption associated with the processing loads of the response device 2.

Also, the remote control unit 121 is configured so as to function as a controller directly controlling the data storage unit 24. Therefore, it is possible to issue a direct transaction between the remote control unit 121 and the data storage unit 24 via communication. With this configuration, it is only necessary for the remote access unit 122 and the communication unit 23 to add and remove an MAC header, so that the remote control unit 121 can control the data storage unit 24 using protocol directly controlling the data storage unit 24. Since iSCSI is not assumed, TCP/IP layer protocol is not necessary. Therefore, processing overhead of the TCP/IP layer and the implementation cost pertaining to the TCP/IP layer are reduced to zero.

Other Modifications Pertaining to Present Embodiment (1) In the present embodiment, a case where the request device 1 directly issues an access command to the data storage unit 24 is described. The present invention, however, is not limited in this way. For example, the request device 1 may transmit data for indirectly notifying the communication unit 23 of processing to the communication unit 23, the communication unit 23 may convert the transmitted data into an access command according to the notified processing, and the communication unit 23 may directly issue the access command to the data storage unit. With such a configuration, the request device 1 does not have to know a method to access the data storage unit 24. Therefore, it is possible to implement a more abstract access method.

(2) In the present embodiment, a case where the data storage unit 24 connected with other units via a serial link so as to form a ring is a removable SDXC memory card is described. The present invention, however, is not limited in this way. For example, the data storage unit 24 may be a built-in flash memory or a volatile RAM. Alternatively, the data storage unit 24 may not be a recording unit and may be a functional LSI. With such a configuration, transparent and direct communication is performed in various forms between the request device 1 and the response device 2.

(3) In the present embodiment, a case where the direct transfer judgment unit 233 checks whether or not data received from the request device 1 is to be directly transferred each time the data is received is described. The present invention, however, is not limited in this way. For example, the direct transfer judgment unit 233 may not be provided, and all data received from the request device 1 during the direct transfer may directly be transferred. With such a configuration, the direct transfer judgment unit 233 becomes unnecessary, and the implementation cost can be reduced.

(4) In the present embodiment, a case where the validity determination unit 210 determines the validity by checking whether or not the device ID included in the received direct transfer request data matches to the device ID registered in advance is described. The present invention, however, is not limited in this way. For example, the validity determination unit 210 may determine the validity by verifying a signature of the request device 1, or performing authentication between the request device 1 and the response device 2. Here, an example of the authentication is PKI (Public Key Infrastructure) authentication. With such a configuration, safety and reliability of the determination of the validity are improved.

(5) In the present embodiment, a case where a transfer direction among nodes connected with one another via a serial link so as to form a ring is fixed to a clockwise direction is described. The present invention, however, is not limited in this way. For example, the transfer direction may dynamically be optimized according to a transfer distance between nodes. With such a configuration, it is possible to perform more efficient transfer.

(6) In the present embodiment, a case where the nodes connected with one another via a serial link so as to form a ring are the control unit 22, the communication unit 23 and the data storage unit 24 is described. The present invention, however, is not limited in this way. For example, a plurality of communication units and data storage units, or another unit such as an LSI node may be connected. With such a configuration, transparent and direct transfer is performed between the request device 1 and the response device 2. In addition, since a resource within the response device 2 is allowed to access a node to which the direct transfer mode is not set in parallel with the direct transfer, it is possible to achieve more efficient system configuration.

(7) In the present embodiment, a case where the control unit 22, the communication unit 23 and the data storage unit 24 are connected with one another so as to form a ring is described. The present invention, however, is not limited in this way. For example, these units may be connected with one another via a hub, or may be connected with one another in daisy chain topology or in topology combining a hub or daisy chain topology with ring topology. Furthermore, these units may be connected with one another not via a serial link. With such a configuration, it is possible to select optimum topology from a viewpoint of cost and efficiency.

(8) In the present embodiment, a case where the communication unit 23 and the data storage unit 24 are connected so as to form a ring as independent nodes is described. The present invention, however, is not limited in this way. For example, the communication unit 23 and the data storage unit 24 may be embodied as a single node. With such a configuration, the number of nodes connected with one another so as to form a ring is reduced.

(9) In the present embodiment, a case where the request determination unit 21 is a CPU, a main memory and software operating using the CPU and the main memory is described. The present invention, however, is not limited in this way. For example, the request determination unit 21 may be embodied as hardware or a combination of hardware and a microprocessor. With such a configuration, a CPU load is reduced and processing is performed at a higher speed.

(10) In the present embodiment, a case where one request device 1 and one response device 2 perform communication is described. The present invention, however, is not limited in this way. For example, a plurality of request devices and one response device, one request device and a plurality of response devices, or a plurality of request devices and a plurality of response devices may perform communication. With such a configuration, various methods to improve coordination among devices can be achieved.

(11) In the present embodiment, a case where the storage format determination unit 11 determines a storage format used in the data storage unit 24 from a first access command is described. The present invention, however, is not limited in this way. For example, the storage format may be determined in advance according to a type of the data storage unit 24. In this case, when the data storage unit 24 is an SDXC memory card, the storage format is, for example, exFAT. With this configuration, there is no need to determine the storage format each time the direct transfer mode is initiated. Therefore, processing loads are reduced.

(12) In the present embodiment, a case where the storage format used in the data storage unit 24 is exFAT is described. The present invention, however, is not limited in this way. For example, the storage format used in the data storage unit 24 may be FAT32. With such a configuration, it is possible to adapt to storage units on which various file systems are used.

(13) In the present embodiment, a case where WiGig is used as communication technology is described. The present invention, however, is not limited in this way. For example, communication technology such as IEEE802.11n and Gigabit Ethernet™ may be used. With such a configuration, it is possible to adapt to various types of communication technology.

(14) In the present embodiment, a case where the response device 2 initiates the direct transfer mode upon the direct transfer request from the request device 1 is described. The present invention, however, is not limited in this way. For example, the response device 2 may initiate the direct transfer mode and request the request device 1 to access the data storage unit 24. With such a configuration, it is possible to perform push-type data transfer.

(15) In the present embodiment, a case where the remote access unit 122 included in the access request issuing unit 12 adds an MAC header to the direct transfer request and transmits the request as a communication frame is described. The present invention, however, is not limited in this way. For example, the request may be transmitted as an IP packet or a packet of given protocol. With such a configuration, it becomes possible to adapt to various types of communication technology.

Alternatively, the access request issuing unit 12 may separately transmit the direct transfer request to the control unit 22 included in the response device 2 using communication technology such as Wi-Fi, Ethernet and USB without passing through the remote access unit 122. With such a configuration, there is no need to establish communication between the remote access unit 122 and the response device 2 before transmission of the direct transfer request. Therefore, it is possible to reduce power consumption and use an effective network bandwidth.

(16) In the present embodiment, a case where, after the request device 1 issues the access command to the data storage unit 24, the next access command is not issued until the transaction is completed is described. The present invention, however, is not limited in this way. For example, a plurality of access commands may concurrently be issued to concurrently perform a plurality of transactions. With such a configuration, the throughput further increases.

(17) In the present embodiment, a case where setting of the condition for continuing the direct transfer mode is provided for the communication unit 23 is described. The present invention, however, is not limited in this way. For example, the setting may be provided for the data storage unit 24 or for both the communication unit 23 and the data storage unit 24. With such a configuration, it is possible to set the condition for continuing the direct transfer mode more flexibly.

(18) In the present embodiment, a case where the control unit 22 sets a size of directly transferred data as the condition for continuing the direct transfer mode is described. The present invention, however, is not limited in this way. For example, the control unit 22 may set a time to perform direct transfer. With such a configuration, a transfer period is managed, depending on a time, independently from the size of directly transferred data.

Alternatively, for example, the control unit 22 may set a token included in the directly transferred data. With such a configuration, it becomes possible to continue the direct transfer until the communication unit 23 detects the set token. Therefore, the transfer period is dynamically managed in terms of the size of directly transferred data and a transfer time.

Alternatively, for example, setting of a predetermined condition for terminating the direct transfer may be provided in advance for the communication unit 23. Here, the predetermined condition includes, for example, the size of directly transferred data, a period of the direct transfer and a token included in the data. With such a configuration, the control unit 22 does not have to set the condition for continuing the direct transfer each time the direct transfer is performed. Therefore, processing loads are reduced.

Alternatively, for example, the request device 1 may transmit a direct transfer termination command, and the communication unit 23 may detect the transmitted command. With such a configuration, the direct transfer is terminated in accordance with a timing suitable for the request device 1.

(19) In the present embodiment, a case where the control unit 22 provides setting of the direct transfer mode for the communication unit 23, and the request device 1 issues the access command to the data storage unit 24 is described. The present invention, however, is not limited in this way. For example, the communication unit 23 may explicitly notify the request device 1 that the direct transfer mode is initiated. With such a configuration, it is possible to prevent the request device 1 from mistakenly issuing the access command in accordance with a timing at which the direct transfer mode is not initiated.

(20) In the present embodiment, a case where the direct transfer judgment unit 233 judges whether or not only data received from the request device 1 is required to be directly transferred is described. The present invention, however, is not limited in this way. For example, the direct transfer judgment unit 233 may judge whether or not data transferred from the data storage unit 24 is required to be directly transferred. With such a configuration, not all data is transmitted from the data storage unit 24 to the request device 1. Therefore, wasteful transmission processing is reduced.

(21) In the present embodiment, a case where, as a processing flow of the communication unit 23 during the direct transfer, processing of receiving data from the request device 1 and processing of transmitting data transferred from the data storage unit 24 are exclusively performed is described.

The present invention, however, is not limited in this way. For example, even during the direct transfer, the transmission processing and the reception processing may be performed in parallel. With such a configuration, throughput of both the transmission processing and the reception processing increases.

(22) In the present embodiment, a case where the request device 1 is a part of a broadcast receiving device 911 such as a BD recorder, and the response device 2 is a part of a mobile terminal such as a mobile phone 912 is described. The present invention, however, is not limited in this way. For example, each of the request device 1 and the response device 2 may be a part of consumer equipment such as a personal computer, a digital TV 910 and a digital camera 913 as an integrated circuit implemented on a circuit board 901, or may be a part of an in-car terminal 914 such as a car navigation system installed in a vehicle 915. With such a configuration, efficient data transfer is performed among various devices.

INDUSTRIAL APPLICABILITY

The present invention achieves efficient data transfer between devices remote from each other. In particular, when the request device accesses the data storage unit included in the response device, overhead of control over the data transfer is significantly reduced, data transfer processing loads of the response device and electricity consumption attributable to the data transfer processing are reduced, and throughput of the data transfer between devices significantly increases, compared with conventional technology. Therefore, the present invention is effective as an integrated circuit product used in a case where devices remote from each other directly perform data transfer to a high-speed and large-capacity storage device using super high-speed wireless communication technology. The present invention is also effective as an integrated circuit product, a home electric appliance, a personal computer and a mobile terminal such as a mobile phone, a smart phone and a tablet terminal used in a case where data transfer is performed between devices remote from each other.

REFERENCE SIGNS LIST 1 request device
11 storage format determination unit
12 access request issuing unit
121 remote control unit
122 remote access unit
2 response device
21 request determination unit
210 validity determination unit
22 control unit
220 condition set unit
23 communication unit
231 reception unit
232 received data formatting unit
233 direct transfer judgment unit
234 transmitted data formatting unit
235 transmission unit
24 data storage unit

The invention claimed is:

1. A response device that responds to a request from a request device, comprising:
   a communication device that performs communication with the request device;
   a non-transitory recording medium including memory that stores data therein, the non-transitory recording medium interpreting an access command issued to the non-transitory recording medium and performing processing with respect to the memory;
   control circuitry that controls the communication device and the non-transitory recording medium; and
   a processor that determines whether or not the request from the request device is a direct transfer request to directly transfer data to or from the non-transitory recording medium, wherein
   the processor determines whether or not the request from the request device is the direct transfer request based on (i) a device ID of the request device included in the request from the request device and (ii) a data type of data extracted from the request from the request device, such that the processor determines the request from the request from the request device is the direct transfer request in a case where (i) the device ID of the request device is registered with response device in advance and (ii) the data type of the data extracted from the request from the request device is an access command or data to be transferred to the non-transitory recording medium,
   the non-transitory recording medium only processes an access command from the control circuitry when the control circuitry has a right to access the non-transitory recording medium,
   when the processor determines affirmatively,
      the control circuitry assigns a right to access the non-transitory recording medium to the communication device,
      the communication device directly transfers, to the non-transitory recording medium, an access command issued from the request device to the non-transitory recording medium, and
      the non-transitory recording medium interprets and processes the access command.

2. The response device of claim 1, wherein
when the processor determines affirmatively, the communication device directly transfers data pertaining to the access command to the non-transitory recording medium.

3. The response device of claim 1, wherein
when the processor determines affirmatively, the non-transitory recording medium directly transfers data pertaining to the access command to the communication device.

4. The response device of claim 1, wherein
when the processor determines negatively, the control circuitry does not assign the right to access the non-transitory recording medium to the communication device.

5. The response device of claim 1, wherein
the control circuitry has a right to access the communication device and the non-transitory recording medium when the direct transfer is not performed.

6. The response device of claim 1, wherein
the communication device judges whether or not data received from the request device is to be transferred to the non-transitory recording medium,
when the communication device judges affirmatively, the communication device directly transfers the received data to the non-transitory recording medium, and
when the communication device judges negatively, the communication device does not directly transfer the received data to the non-transitory recording medium.

7. The response device of claim 1, wherein
the communication device judges whether or not data received from the non-transitory recording medium is to be transferred to the request device, when the communication device judges affirmatively, the communication device transfers the received data to the request device, and when the communication device judges negatively, the communication device does not transfer the received data to the request device.

8. The response device of claim 1, wherein
the communication device formats data received from the request device according to a data format recognizable by the non-transitory recording medium.

9. The response device of claim 1, wherein
the communication device formats data directly transferred from the non-transitory recording medium so that the directly transferred data is in a data format suitable for transmission to the request device.

10. The response device of claim 1, wherein
the control circuitry provides setting of a condition for continuing the direct transfer for one of the communication device and the non-transitory recording medium, when the processor determines affirmatively, the control circuitry sets the condition for continuing the direct transfer, and when the condition for continuing the direct transfer is not met, the one of the communication device and the non-transitory recording medium terminates the direct transfer.

11. The response device of claim 10, wherein
the condition for continuing the direct transfer is that a period of the direct transfer is equal to or shorter than a predetermined period.

12. The response device of claim 10, wherein
the condition for continuing the direct transfer is that a size of directly transferred data is equal to or smaller than a predetermined size.

13. The response device of claim 10, wherein
the condition for continuing the direct transfer is that a predetermined token is not detected from transferred data.

14. The response device of claim 1, wherein
the communication device terminates the direct transfer according to a predetermined condition for terminating the direct transfer, and the predetermined condition is set before the control circuitry receives the direct transfer request.

15. The response device of claim 14, wherein
the predetermined condition is that a period of the direct transfer exceeds a predetermined period.

16. The response device of claim 14, wherein
the predetermined condition is that a size of directly transferred data exceeds a predetermined size.

17. The response device of claim 14, wherein
the predetermined condition is that a predetermined token is detected from transferred data.

18. The response device of claim 1, wherein
the processor determines whether or not the direct transfer request is valid, and only when (i) the processor determines affirmatively that the request from the request device is a direct transfer request and (ii) the processor determines affirmatively that the direct transfer request is valid, the control circuitry performs control so that data is directly transferred between the communication device and the non-transitory recording medium.

19. The response device of claim 1, wherein
the control circuitry, the communication device, and the non-transitory recording medium are connected with one another so as to form a ring.

20. The response device of claim 1, wherein
the request device issues the access command according to an access format defined by the non-transitory recording medium.

21. The response device of claim 1, wherein
the request device determines a storage format used in the non-transitory recording medium.

22. An integrated circuit that responds to a request from a request device, comprising:
a communication device that performs communication with the request device;
a non-transitory recording medium including memory that stores data therein, the non-transitory recording medium interpreting an access command issued to the non-transitory recording medium and performing processing with respect to the memory;
control circuitry that controls the communication device and the non-transitory recording medium; and
a processor that determines whether or not the request from the request device is a direct transfer request to directly transfer data to or from the non-transitory recording medium, wherein the processor determines whether or not the request from the request device is the direct transfer request based on (i) a device ID of the request device included in the request from the request device and (ii) a data type of data extracted from the request from the request device, such that the processor determines the request from the request from the request device is the direct transfer request in a case where (i) the device ID of the request device is registered with response device in advance and (ii) the data type of the data extracted from the request from the request device is an access command or data to be transferred to the non-transitory recording medium, the non-transitory recording medium only processes an access command from the control circuitry when the control circuitry has a right to access the non-transitory recording medium, when the processor determines affirmatively,
the control circuitry assigns a right to access the non-transitory recording medium to the communication device,
the communication device directly transfers, to the non-transitory recording medium, an access command issued from the request device to the non-transitory recording medium, and
the non-transitory recording medium interprets and processes the access command.

23. The integrated circuit of claim 22, wherein
when the processor determines affirmatively, the communication device directly transfers data pertaining to the access command to the non-transitory recording medium.

24. The integrated circuit of claim 22, wherein
when the processor determines affirmatively, the non-transitory recording medium directly transfers data pertaining to the access command to the communication device.

25. A response method used in a response device that responds to a request from a request device, the response device including: a communication device configured to perform communication with the request device; a non-transitory recording medium including memory that stores data therein, the non-transitory recording medium interpreting an access command issued to the non-transitory recording medium and performing processing with respect to the memory; and control circuitry configured to control the communication device and the non-transitory recording medium, the response method comprising:

a request determination step of determining the request from the request device, wherein the request determination step determines whether or not the request from the request device is the direct transfer request based on (i) a device ID of the request device included in the request from the request device and (ii) a data type of data extracted from the request from the request device, such that the request determination step determines the request from the request from the request device is the direct transfer request in a case where (i) the device ID of the request device is registered with response device in advance and (ii) the data type of the data extracted from the request from the request device is an access command or data to be transferred to the non-transitory recording medium, the non-transitory recording medium only processes an access command from the control circuitry when the control circuitry has a right to access the non-transitory recording medium, when the request determination step determines that the request from the request device is a direct transfer request to directly transfer data to or from the non-transitory recording medium, the control circuitry assigns a right to access the non-transitory recording medium to the communication device, the communication device directly transfers, to the non-transitory recording medium, an access command issued from the request device to the non-transitory recording medium, and the non-transitory recording medium interprets and processes the access command.

26. The response method of claim 25, wherein
when the request determination step determines that the request from the request device is the direct transfer request, the communication device directly transfers data pertaining to the access command to the non-transitory recording medium.

27. The response method of claim 25, wherein
when the request determination step determines that the request from the request device is the direct transfer request, the non-transitory recording medium directly transfers data pertaining to the access command to the communication device.

28. A response system composed of a request device and a response device that responds to a request from the request device, wherein the response device includes:

a communication device that performs communication with the request device;

a non-transitory recording medium including memory that stores data therein, the non-transitory recording medium interpreting an access command issued to the non-transitory recording medium and performing processing with respect to the memory;

control circuitry that controls the communication device and the non-transitory recording medium; and a processor that determines whether or not the request from the request device is a direct transfer request to directly transfer data to or from the non-transitory recording medium, the processor determines whether or not the request from the request device is the direct transfer request based on (i) a device ID of the request device included in the request from the request device and (ii) a data type of data extracted from the request from the request device, such that the processor determines the request from the request from the request device is the direct transfer request in a case where (i) the device ID of the request device is registered with response device in advance and (ii) the data type of the data extracted from the request from the request device is an access command or data to be transferred to the non-transitory recording medium, the non-transitory recording medium only processes an access command from the control circuitry when the control circuitry has a right to access the non-transitory recording medium, when the processor determines affirmatively,
the control circuitry assigns a right to access the non-transitory recording medium to the communication device, the communication device directly transfers, to the non-transitory recording medium, an access command issued from the request device to the non-transitory recording medium, and the non-transitory recording medium interprets and processes the access command, and the request device issues the access command according to an access format defined by the non-transitory recording medium.

29. The response system of claim 28, wherein
when the processor determines affirmatively, the communication device directly transfers data pertaining to the access command to the non-transitory recording medium.

30. The response system of claim 28, wherein
when the processor determines affirmatively, the non-transitory recording medium directly transfers data pertaining to the access command to the communication device.

* * * * *